(12) United States Patent
Huang et al.

(10) Patent No.: US 10,205,592 B2
(45) Date of Patent: Feb. 12, 2019

(54) PHYSICAL LAYER KEY DISTRIBUTION FOR LONG DISTANCE REPEATED NETWORKS USING RANDOM ENVIRONMENTAL INSTABILITY

(71) Applicant: NEC Laboratories America, Inc., Princeton, NJ (US)

(72) Inventors: Yue-Kai Huang, Princeton, NJ (US); Fatih Yaman, Princeton, NJ (US); Ben Wu, Glassboro, NJ (US)

(73) Assignee: NEC Corporation (JP)

( * ) Notice: Subject to any disclaimer, the term of this patent is extended or adjusted under 35 U.S.C. 154(b) by 63 days.

(21) Appl. No.: 15/279,397

(22) Filed: Sep. 28, 2016

(65) Prior Publication Data

US 2017/0104595 A1  Apr. 13, 2017

Related U.S. Application Data

(60) Provisional application No. 62/240,030, filed on Oct. 12, 2015.

(51) Int. Cl.
| | |
|---|---|
| *H04L 29/06* | (2006.01) |
| *H04L 9/08* | (2006.01) |
| *H04J 14/02* | (2006.01) |
| *H04B 10/27* | (2013.01) |
| *H04B 10/25* | (2013.01) |

(52) U.S. Cl.
CPC ....... *H04L 9/0861* (2013.01); *H04B 10/2503* (2013.01); *H04B 10/27* (2013.01); *H04J 14/02* (2013.01); *H04L 9/0819* (2013.01)

(58) Field of Classification Search
CPC ...... H04L 9/0861; H04L 9/0819; H04J 14/02; H04B 10/27; H04B 10/2503
See application file for complete search history.

(56) References Cited

U.S. PATENT DOCUMENTS

| | | | | |
|---|---|---|---|---|
| 2006/0290941 | A1* | 12/2006 | Kesler | H04B 10/70 356/491 |
| 2012/0076301 | A1* | 3/2012 | Kanter | H04K 1/02 380/256 |
| 2016/0041523 | A1* | 2/2016 | Ashrafi | G03H 1/2645 359/9 |

OTHER PUBLICATIONS

Physical layer secret key generation for fiber-optical networks|https://www.osapublishing.org/DirectPDFAccess/5B2E9B53-C3A9-1729-D5B913E316DF884F_268539/oe-21-20-23756.pdf?da=1&id=268539&seq=0&mobile=no|Kravtsov et al.|vol. 21, No. 20|pp. 1-16 (Year: 2013).*

* cited by examiner

*Primary Examiner* — Mahfuzur Rahman
(74) *Attorney, Agent, or Firm* — Joseph Kolodka

(57) ABSTRACT

Aspects of the present disclosure describe methods and systems for improved secure key generation and distribution employing environmental instability induced signal phase fluctuations that are compatible with commercial wavelength division multiplexed (WDM) optical systems and associated optical amplifiers for long-haul transmission.

2 Claims, 4 Drawing Sheets

PHYSICAL LAYER KEY DISTRIBUTION FOR LONG DISTANCE REPEATED NETWORKS USING RANDOM ENVIRONMENTAL INSTABILITY

CROSS REFERENCE TO RELATED APPLICATIONS

This application claims the benefit of U.S. Provisional Patent Application Ser. No. 62/240,030 filed Oct. 12, 2015 the entire contents of which are incorporated by reference as if set forth at length herein.

TECHNICAL FIELD

This disclosure relates generally to systems and methods for secure encryption key generation and distribution and in particular to secure key distribution using environment instability induced signal phase fluctuations.

BACKGROUND

As is known, key distribution is an important consideration and characteristic required for network security.

Accordingly, given its importance to contemporary network security, methods, structures and apparatus that facilitate the secure distribution of such keys, would represent a welcome addition to the art.

SUMMARY

An advance in the art is made according to the present disclosure which describes methods and structures for improved secure key distribution. In sharp contrast to prior art methods, systems, and structures—and in particular software methods—methods, systems and structures according to the present disclosure is based on the instability of a fiber interferometer. According to an aspect of the present disclosure, keys are generated by an unstable effect which provides an asymmetric standing between communicating parties and eavesdropper. Communicating parties use the instability directly for key generation and detection, while eavesdropper(s) introduce(s) extra instability such that the key(s) cannot be determined by the eavesdropper.

As compared with prior-art methods, systems and structures which have been incompatible with contemporary optical amplifiers and therefore cannot be transmitted over long distances, methods, systems and structures according to the present disclosure permit the generation and transmission of such keys over long distances.

Finally, and in further contrast to prior art methods, systems, and structures—which employed bidirectional transmission in a same fiber, methods, systems and structures according to the present disclosure employs a uni-directional transmission using two fibers, thus allowing methods, systems and structures according to the present disclosure compatible with uni-directional optical amplifiers that are used contemporaneously in long-haul terrestrial and submarine networks.

Advantageously, key distribution methods, systems and structures according to the present disclosure are compatible with both optical amplifiers for long-range transmission and can be implemented over existing fiber optic network with neighboring WDM channels. The key is generated from the fiber index fluctuation induced by the environmental instabilities—including temperature changes and mechanical vibrations.

Each communicating pair of fibers employ an interferometer to convert the combined environmental instabilities to phase signals. Broadband sources are used as a signal carrier to improve system security by minimizing signal coherence length.

Advantageously, security of the system relies on the fact that the light source has a short coherence length while a large optical delay difference is applied in the interferometers. Any eavesdropper would have to search for a large range optical delay in order to find a short coherence length. Moreover, even if an eavesdropper knows the optical delay, (s)he has to apply a same amount of delay to recover the phase information.

BRIEF DESCRIPTION OF THE DRAWING

A more complete understanding of the present disclosure may be realized by reference to the accompanying drawing in which.

Figure 1:
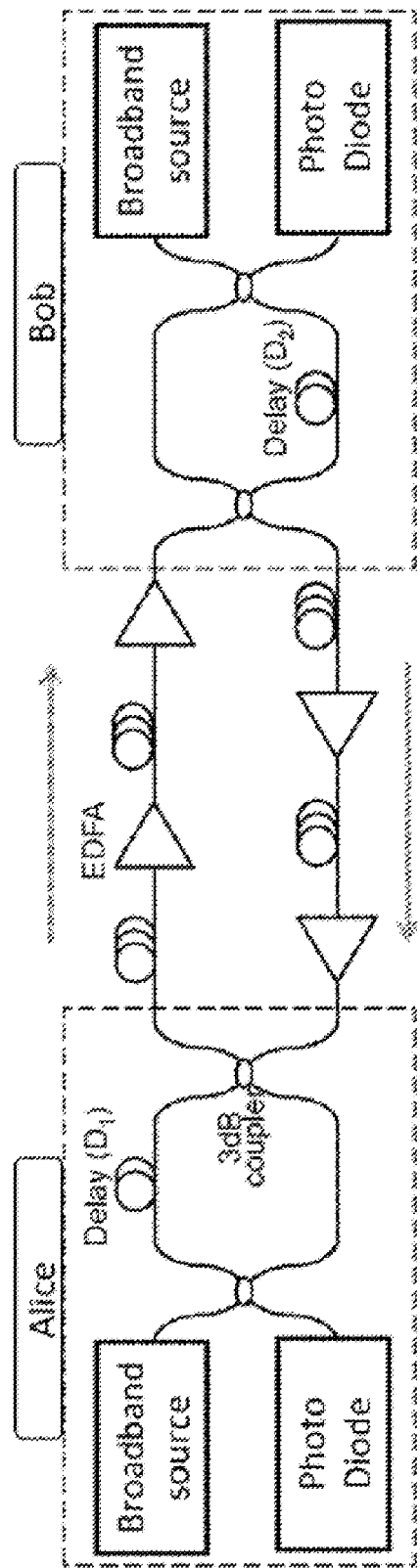
FIG. 1 is a schematic block diagram illustrating an experimental setup according to an aspect of the present disclosure.

The illustrative embodiments are described more fully by the Figures and detailed description. Inventions according to this disclosure may, however, be embodied in various forms and are not limited to specific or illustrative embodiments described in the Figures and detailed description

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGs comprising the drawing are not drawn to scale.

By way of some additional background, we again note that oftentimes Network security relies on data encryption occurring between signal transmitters and receivers. One fundamental enabler of such data encryption is the secure generation and distribution of an encryption key. If the encryption key is attacked and exposed to an eavesdropper, an encrypted signal may be easily decrypted.

Traditional key generation schemes and systems constructed therefrom are oftentimes based on software algorithms. For example, the Rivest-Shamir-Adleman (RSA) cryptosystem, is based on the fact that it is difficult to factor the product of two large prime numbers [See, e.g., R. L. Rivest, etal, "A method for obtaining digital signatures and public-key cryptosystems," Communications of the ACM 21, 120-126 (1978)). The security of the system relies on computation resources available for the eavesdropper, while the increasing power of quantum computing raises a potential challenge to the software-based key generation schemes (See, e.g., P. W. Shor, "Polynomial-time algorithms for prime factorization and discrete logarithms on a quantum computer," SIAM J. COMPT. 26, 1484-1509 (1997)).

In contrast to such software systems, physical layer key generation schemes are known as alternative approaches for encryption systems. One such scheme—quantum key distribution (QKD)—has been widely studied as a secure key distribution system [See, e.g., H. K. Lo, etal, "Secure quantum key distribution," Nature Photonics 8, 596-604 (2014)).

The overall security of a QKD system relies—in part—on the fact that an eavesdropper cannot measure the signal, which is a quantum state of a single photon without knowing the eigenvalues of the quantum states. Compared with software based key distribution, QKD has the advantages that if an eavesdropper records the wrong quantum state, the original signal is lost and changed, and the eavesdropper cannot use post-processing techniques to recover the signal.

Although QKD has been demonstrated to be secure, the deployment of a QKD system has practical issues. First, the QKD system requires single photon transmission, which means the signal cannot be amplified by standard optical amplifiers. As will be readily understood by those skilled in the art, such a restriction limits the transmission distance within 100-200 km without regeneration. Second, due to the extreme sensitive nature of the single photon detection, a QKD scheme is not compatible with standard commercial wavelength division multiplexing (WDM) systems.

With this further background in place, we note that according to the present disclosure—we demonstrate a key distribution method and structure(s) that is compatible with optical amplifiers for long-range transmission. Of particular advantage, such a key distribution scheme according to the present disclosure may be implemented using existing fiber optic network(s) having neighboring WDM channels.

The key is generated from the fiber index fluctuation induced by the environmental instabilities including temperature changes and mechanical vibrations (See, e.g., K. Kravtsov, etal, "Physical layer secret key generation for fiber-optical networks," Opt. Express 21, 23756-23771 (2013)). Each of the communicating pair employs an interferometer to convert the combined environmental instabilities to phase signals.

Broadband sources are used as the signal carrier to improve system security by minimizing signal coherence length. The security of the system relies on the fact that the light source has short coherence length while large optical delay difference is applied in the interferometers. Accordingly, an eavesdropper would have to search over a large range optical delay in order to find a short coherence length. Moreover, even if the eavesdropper knows the optical delay, (s)he has to apply same amount of delay to recover phase information. Furthermore, any extra delay that the eavesdropper uses also generates phase changes from environmental instabilities and adds phase randomness to the measured key signal.

FIG. 1 is a schematic diagram illustrating a structure for a key distribution scheme according to an aspect of the present disclosure. As may be observed, the illustrative structure includes two Mach-Zehnder (MZ) delayed interferometer(s). The two MZ interferometers each include a delay loop (D1 and D2) that provides a delay to a respective MZ interferometer. The two MZ interferometers are optically connected to one another (output of one to input of the other and vice versa) via a "transmission span" including one or more length(s) of optical fiber and one or more optical amplifiers, i.e., erbium-doped fiber amplifier(s) (EDFA). A key signal is derived from phase fluctuation in the fiber interferometer.

As depicted in that illustration shown schematically in FIG. 1, there are shown the two MZ interferometers—used illustratively by Alice and Bob. As will be readily appreciated with respect to this illustration, both Alice and Bob send and receive signals exhibiting phase(s) affected by local temperature changes and mechanical vibrations. Since signals in both directions traverse the same physical paths, the interference results at the MZ Interferometer outputs will be the same at both ends, thus enabling key sharing.

Shown further in that figure, broadband sources are used as signal carriers to prevent eavesdropper(s) from measuring the phase directly with—for example—coherent detection mechanisms. In the illustrative scenario depicted in the figure, both Alice and Bob use a filtered amplifier spontaneous emission (ASE) from erbium doped fiber amplifier (EDFA) with bandwidth of substantially 1500 Hz and a center wavelength at 1547.6 nm as the light source. Since the broadband source has a short coherence length, the optical delay from Alice (L1) and Bob (L2) is matched to within a few millimeters to recover the phase information.

In the illustrative configuration shown in FIG. 1, the optical delay we used ranges from 20 m to 26 km, which means without information about the optical delay used, the eavesdropper has to scan the optical delay and search for a few millimeter ranges in the range of 26 km to find the coherence length. Even if an eavesdropper is able to somehow find the right optical delay, (s)he still needs an interferometer that matches the delay and generates new phase randomness in addition to the phase information (s)he wants to measure. In a case such as the one described, an eavesdropper can never precisely measure the phase information.

With further reference to FIG. 1, we note that the basic structure—the two MZ interferometers of Alice and Bob, are employed to generate a key signal due to the instability of the two optical delays (D1 and D2) positioned in the interferometer(s), respectively. Since the phases of the signals traversing the optical fibers are very sensitive to many environmental parameters including temperature, mechanical vibrations, and acoustic waves, the accumulated phase differences in the optical delays are random and difficult to predict by measuring the environmental parameters. The phase differences generated by the optical delay pairs (D1 and D2) create different states of interferences (between constructive and destructive) between the signals with identical path length. Since the optical signal generated from Alice and Bob pass through the same optical delay pairs, Alice and Bob receive the same interference result. Advantageously, and as can surely be appreciated by those skilled in the art, the interference result can then be used as a key distributed secretly between Alice and Bob.

Advantageously, optical broadband sources are used in key distribution scheme(s)—according to the present disclosure, so an eavesdropper cannot measure the phase directly. The bandwidth(s) of optical sources may be orders of magnitude larger than the bandwidth of any commercially available coherent receivers so it will be largely impossible to store all of the optical signal information digitally for additional signal processing. Since the broadband sources exhibit short coherence length(s), in order for an eavesdropper to observe the effect of the phase change (s)he will need to match the optical delay within the coherence length of the broadband sources. However, the coherence length of the broadband source(s) range from sub-millimeter to centimeters—depending on the spectral width—while several tens of kilometers of optical delays can be easily applied by Alice and Bob. Accordingly, without information about the optical delay, the eavesdropper has to match the length down to several millimeters in resolution over a range of tens of kilometers. Even if an eavesdropper can match the length of the optical delay, the MZI (s)he uses will also generate phase instability at the same order of magnitude as the phase difference that (she) needs to measure. The uncertainty of this measurement is as large as the signal to be measured, thus rendering the attack ineffective.

Notably, we have demonstrated the transmission of a key distribution channel—according to the present disclosure—using a standard C-band transmission window. The 240-km bi-directional fiber-pair link includes three 80-km single mode fiber (SMF) spans, with erbium-doped fiber amplifier (EDFA) to compensate the average fiber loss of 17.5 dB. Thirty-eight (38) dummy WDM channels were emulated by carving a broadband source using a flexible-band wavelength selective switch (WSS) at 100-GHz spacing. Advantageously, our key distribution scheme was verified in this 240-km long WDM link, achieving a key-rate of 100 bps and pre-coded key error rate of only 0.5%.

Figure 2A:
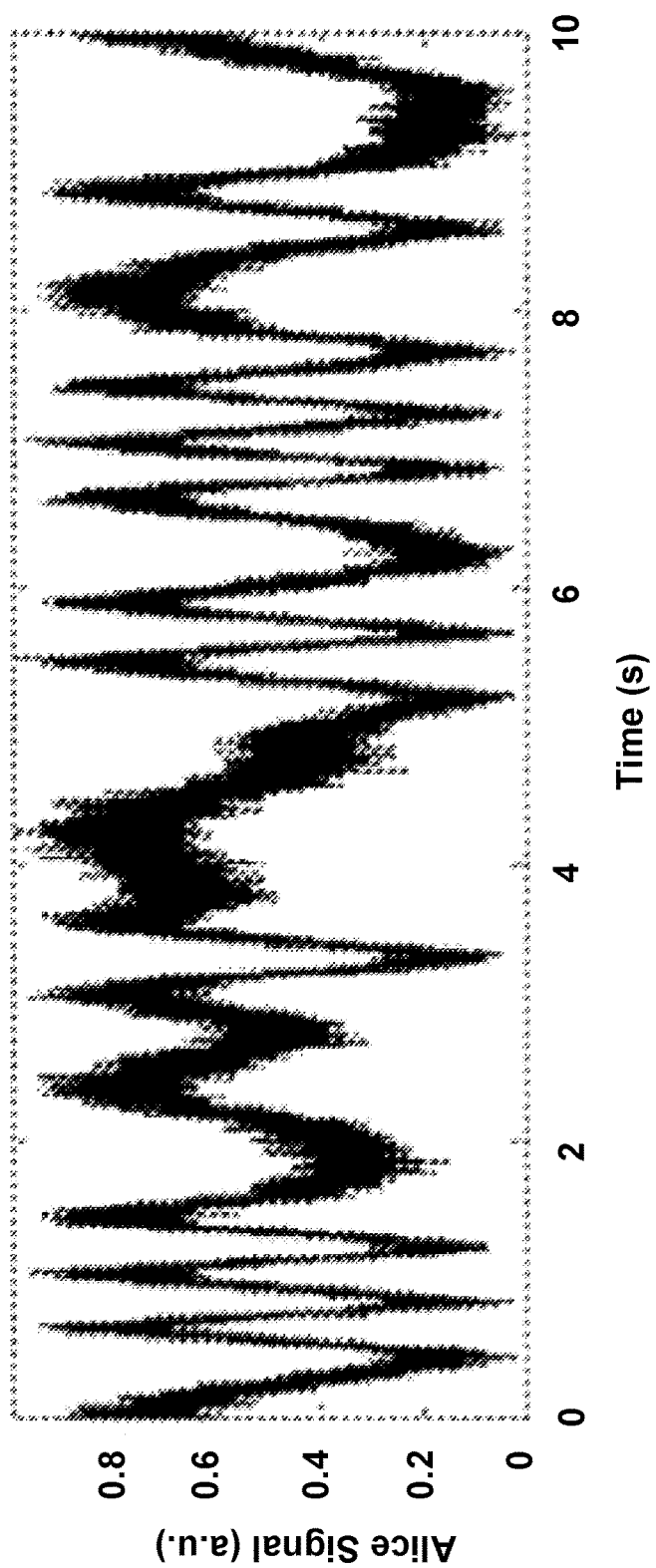
FIGS. 2(a) and 2(b) are a set of plots showing experimental measurement time domain signals received by 2(a) Alice, and 2(b) Bob for the experimental setup of FIG. 1 according to an aspect of the present disclosure.
Figure 2B:
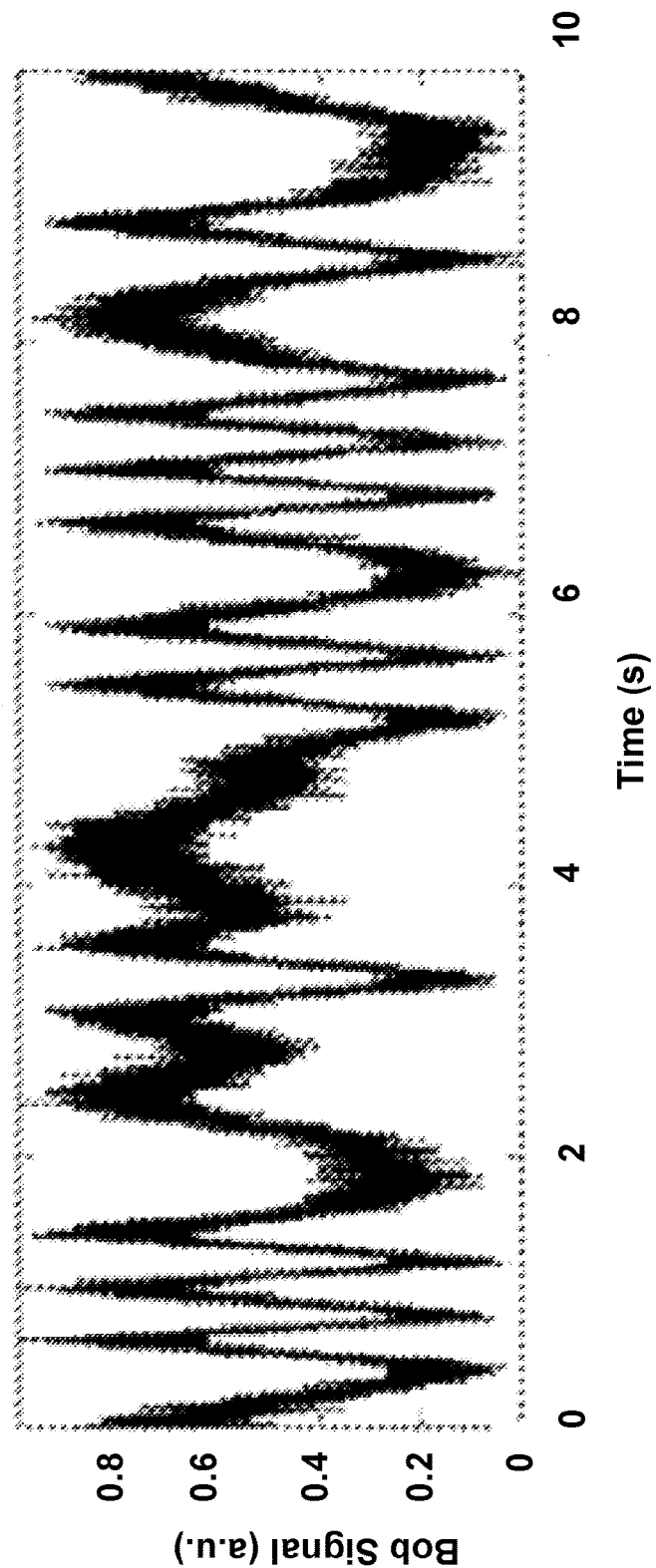

FIG. 2(a) and FIG. 2(b) are plots illustrating time domain signal(s) received by Alice and Bob, respectively. The signals shown have their intensities normalized and the comparison of the signal received by Alice and Bob shows that they have indeed received the same waveform due to the joint measurement of phase instability due to MZI. These analog signals can be further digitized to generate key shared by Alice and Bob. The length of the key sequence depends on number of levels in each time sample.

As will be appreciated, FIGS. 2(a) and (b) demonstrates a system according to the present disclosure having back-to-back transmission and an optical delay of 20 m. The Fourier transform of the signal received by Alice shows that the changing speed is several hertz (See, e.g., FIG. 3). To increase the key generation speed, longer optical delay (up to tens of km) may be used to increase the speed of phase fluctuation in MZI, wherein the key generation speed is proportional to the length of the optical delay.

As will be appreciated by those skilled in the art with respect to the illustrative configuration and results shown—when 26 km optical delay is applied by Alice and Bob, the direct detection of the interference results matches in the situation where back-to-back transmission is employed, and when the signal is transmitted over 240 km, the signals do not match. This is because the key distribution between Alice and Bob is based on the assumption that when the signal is transmitted from Alice to Bob, the environmental condition has to remain the same, so the signal transmitted from Bob to Alice has the same phase change. In the case of 240 km transmission, phase change occurs in less than 1 ms, while it takes the light signal 1.2 ms to traverse 240 km in the fiber. The signals in the dual directions experience different phase changes.

Note that although using a shorter optical delay can match the signal between Alice and Bob, it will make it easier for the eavesdropper to find the optical delay. Since the speed at which the changing of the phase is proportional to the optical delay length in the interferometer, a slower changing phase give the dual direction signal enough time to transmit between Alice to Bob and therefore undergo the same amount of phase change. However, the eavesdropper can use coherence detection to measure part of the signal spectrum and the fringes in the spectrum indicate the optical delay difference (see, e.g., FIG. 3). To find the fringes, the temporal data collected by the eavesdropper needs to be long enough so the Fourier transform of the temporal data, which is a spectrum, has the resolution to observe the fringes. While on the other side, if the eavesdropper collects data so long that the phase has changed, the fringes will shift and average to a constant.

Figure 3:
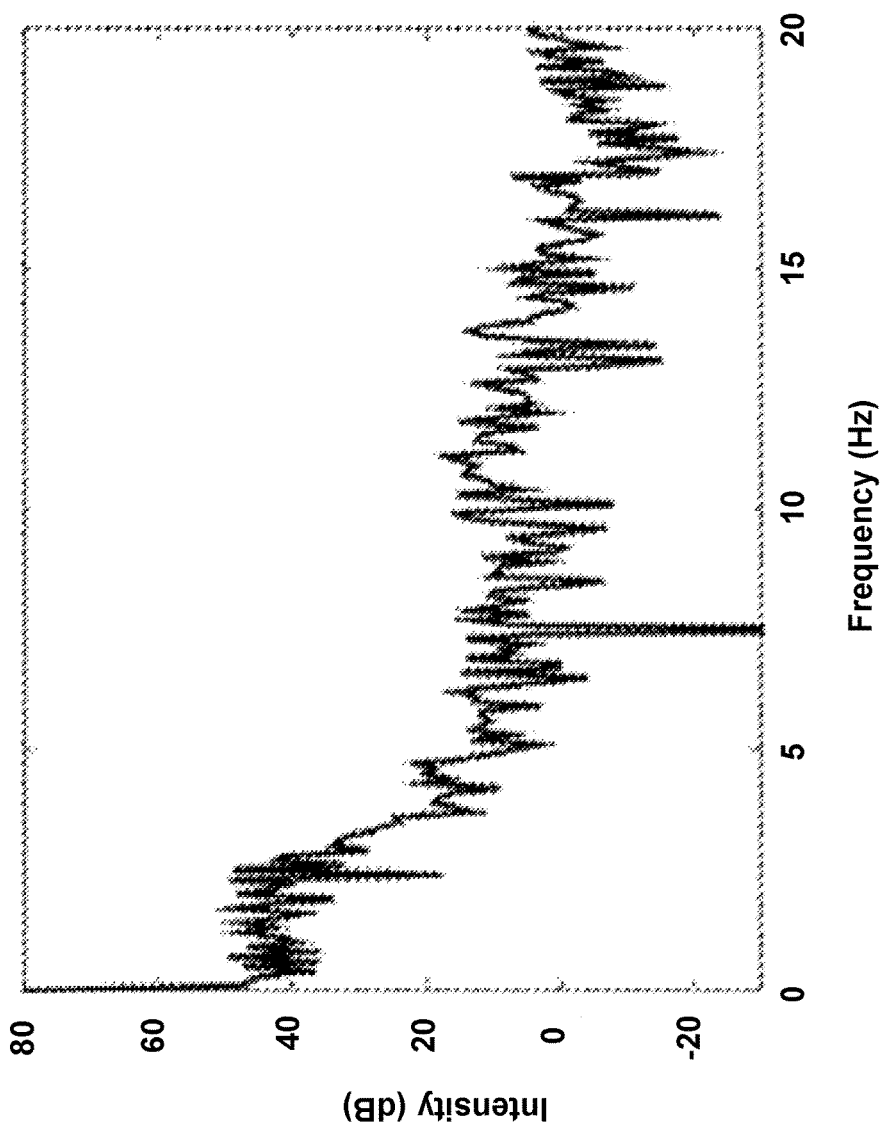
FIG. 3 is a plot showing frequency domain signal received by Alice according to an aspect of the present disclosure.

Accordingly, to prevent the eavesdropper's attack, the optical delay difference has to be long enough to enable the phase change before the eavesdropper collects the temporal data. Moreover, a longer optical delay difference corresponds to a narrower fringe, which means the eavesdropper needs a higher spectrum resolution and longer temporal data. In our experimental configuration, we perform the coherence detection as an eavesdropper to attack the system. We found that the optical delay has to be in the order of 26 km for the fringes to disappear (FIG. 3).

Notably, the fast changing phase from the long optical delay protects the system from attack, while it also leads to signal mismatch between Alice and Bob. To match the signal, the fast changing component of the phase has to be removed and the slow changing component of the phase can be used as key distribution. Since the direct detection of the interference signal is the cosine of the phase, and cosine is not a monotonic function, the sine of the phase is needed to recover the phase. We used a phase modulator that switches between 90° and 0° at a rate of 100 kHz—which is more than 10 times faster than the phase changing rate. In this case, both sine and cosine of the phase can be measured, so the original phase can be recovered. A low pass filter with 3 dB cutoff frequency 125 Hz is applied to the phase signal and FIGS. 4 (c) and (d) shows that the cosine of the filtered phase signal matches. The cross correlation of Alice's and Bob's signal reached to 0.8 at 0 delay and drop to 0 when the delay is not matched, which means the signal is truly random.

To extract the key from the analog signal, we set a buffer region in the middle and the sampled point is dropped if it falls in the buffer region. Two level digitization is applied and both sine and cosine of the phase can be used to generate keys. The key generation rate is 100 bps with error rate of only 0.5%. To increase the key rate, the shape of the waveform can be considered for multi-level digitization.

As is now apparent to those skilled in the art, we have described and experimentally evaluated a key distribution system based on environmental instabilities. Advantageously, the key signal can be amplified by EDFAs and 240 km bi-directionally transmission has been demonstrated. The key distribution channel shares the C-band transmission spectrum with 38 neighboring WDM channels. The system generates key at the rate of 100 bps with error rate of 0.5%. To attack the system, an eavesdropper has to search for the coherence length of a few millimeters in the range of 26 km. The fast changing phase from the long optical delay prevent the eavesdropper from measuring optical delay by the fringes of the spectrum.

At this point, while we have presented this disclosure using some specific examples, those skilled in the art will recognize that our teachings are not so limited. Accordingly, this disclosure should be only limited by the scope of the claims attached hereto.

The invention claimed is:

1. A system comprising:
    a communicating pair of nodes each node including a Mach-Zehnder interferometer (MZI), each MZI including an optical delay loop in one of its arms, wherein the communicating pair of nodes are optically interconnected by a bidirectional fiber-pair link;
    said system configured to generate a secure key from only physical layer characteristics of the system; and
    convey that generated key from one of the nodes to the other;
    wherein the key is generated from fiber index fluctuation induced by environmental instabilities;
    wherein the environmental instabilities include temperature changes and mechanical vibrations;
    wherein the environmental instabilities are converted to phase signals through the effect of the MZI a particular node;
    wherein the optical delay is ≥20 m and ≤26 km;
    wherein the bidirectional fiber-pair link optically connecting the nodes is >200 Km in length; and
    wherein the optical communications system employs wavelength division multiplexing (WDM).

2. The system of claim 1 wherein the bidirectional fiber-pair link optically connecting the nodes includes one or more erbium-doped fiber amplifiers.

* * * * *